Figures 1, 2:
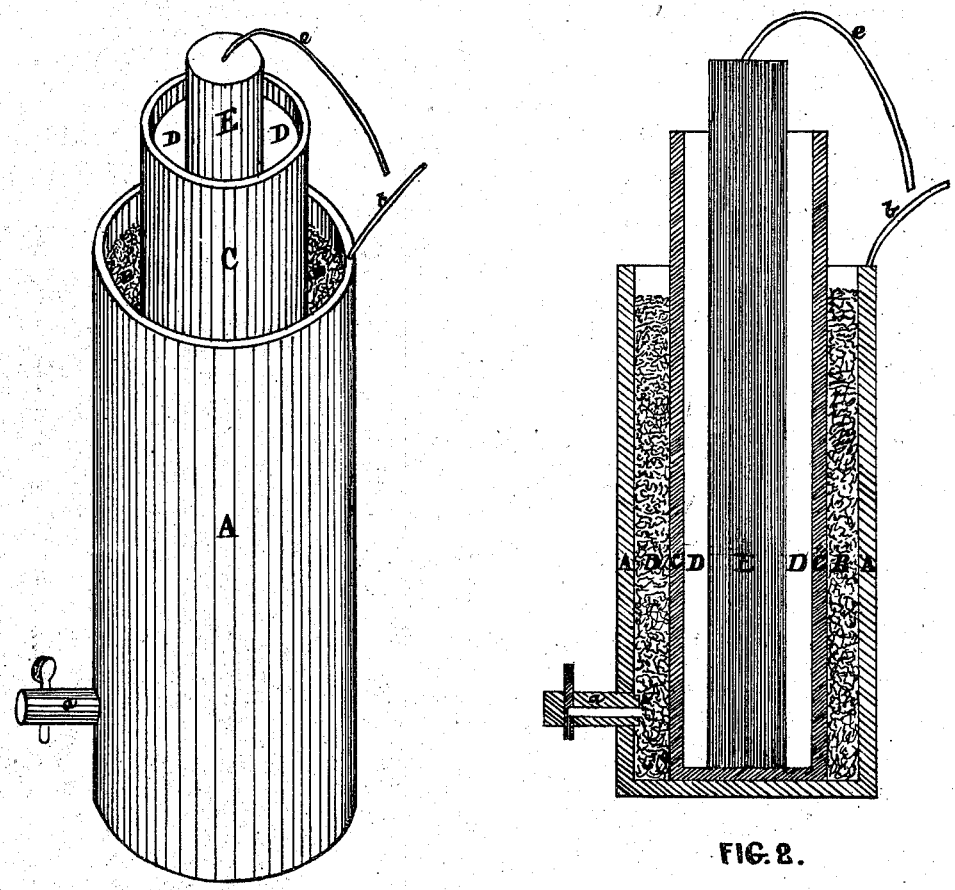

GALVANIC BATTERY.
JAMES R. McPHERSON, BELOIT, WIS.

97949                                    PATENTED DEC 14 1869

Witnesses.

James R. McPherson Inventor

United States Patent Office.

JAMES R. McPHERSON, OF BELOIT, WISCONSIN.

Letters Patent No. 97,949, dated December 14, 1869.

---

IMPROVEMENT IN GALVANIC BATTERIES.

---

The Schedule referred to in these Letters Patent and making part of the same.

---

*To all whom it may concern:*

Be it known that I, JAMES R. McPHERSON, of the city of Beloit, of Rock county, in the State of Wisconsin, have invented certain new and useful Improvements in Galvanic Batteries, herein-below fully described; and I do hereby declare the following description, and accompanying drawings, are sufficient to enable any person skilled in the art or science to which it most nearly appertains, to make and use my said invention or improvements without further invention or experiment.

The nature of my invention and improvements consists in the construction and arrangement of the several parts and ingredients constituting an improved galvanic battery, fulfilling substantially about the following conditions hereinafter set forth and described, reference being had to the accompanying drawings, and to the letters of reference marked thereon, similar letters of reference indicating corresponding parts; in which drawings—

Figure 1 is a perspective view of my improved battery complete in all its parts, and Figure 2 is a central vertical section of the same.

Letter A represents a jar or pot, made of iron, or other suitable metal, of any suitable size, which I use for the outside, or negative of the battery.

I then take an earthen or other porous jar, or pot, C, of suitable corresponding size, so as to set inside of the jar A, leaving a convenient and suitable space, B, between them, according to the size of the battery or fineness of the iron or other metal chips to be used for filling the space B between the said jars, (about half an inch being a medium). I then put some iron chips into the bottom of the jar A, so as to give a circulation under the jar C. I then insert the porous jar C, and fill the space B with iron chips from the lathe, either cast or wrought, or both.

In the space B, with the chips, I use a weak solution of either muriatic or sulphuric acid, or a strong solution of sal-ammoniac. I then fill the porous jar C, to about the level with the iron chips in the space B, with black oxide of manganese, marked D, and nitric acid. I then introduce a good conductor, marked E, (such as coke or platinum,) well down into the manganese, and then attach wires, *e* and *b*, the same as in ordinary batteries.

The faucet *a* is for drawing spent acid from the space B.

The jar C should be considerably taller than the iron jar A, for the reason that the hydrogen that goes to the nitric acid liberates nitrous acid, taking from the manganese, and forms nitric acid.

The nitric acid is only weakened by dilution, and not like other strong batteries, where the nitrous acid passes off in fumes, which not only dilute but destroys. The fumes also, being poisonous, have a deleterious influence on the health of telegraph-operators—a very serious objection, from which my improved battery is entirely free.

The special advantages of this battery are substantially these:

It is much cheaper, costing only about one-tenth as much as batteries now in use; less danger from breaking; fewer changes of acids; has greater volume of power; more intensity; is perfectly constant, and has no poisonous fumes, all which are very important characteristics in a galvanic battery.

What I claim as my invention and improvements, and desire to secure by Letters Patent of the United States, is—

The iron jar A, filled with metal chips saturated with a weak solution of muriatic or sulphuric acid, or strong solution of sal-ammoniac, in combination with the inner porous jar C, filled with black oxide of manganese and nitric acid, and the conductor E, all arranged to operate as herein described and shown.

JAMES R. McPHERSON.

Witnesses:
 B. DURHAM,
 LOUIS C. HYDE.